(No Model.)

A. W. McCONNELL.
FERTILIZER, PULVERIZER, AND DISTRIBUTER.

No. 509,933. Patented Dec. 5, 1893.

A. W. McConnell
Inventor

Witnesses
C. S. Frye
G. Thyrr

By Hopkins & Ackins
Attorneys

UNITED STATES PATENT OFFICE.

ASA WELHORN McCONNELL, OF CARNESVILLE, GEORGIA.

FERTILIZER PULVERIZER AND DISTRIBUTER.

SPECIFICATION forming part of Letters Patent No. 509,933, dated December 5, 1893.

Application filed January 19, 1893. Serial No. 458,924. (No model.)

*To all whom it may concern:*

Be it known that I, ASA WELHORN MCCONNELL, of Carnesville, in the county of Franklin, State of Georgia, have invented certain new and useful Improvements in Pulverizing and Distributing Apparatus for Fertilizing Compounds, of which the following is a specification, reference being had to the accompanying drawings.

The object of my invention is to produce an improved machine for pulverizing fertilizing compounds and for distributing them, as they are pulverized, in a single straight line, analogously to a drill.

Figure 1:
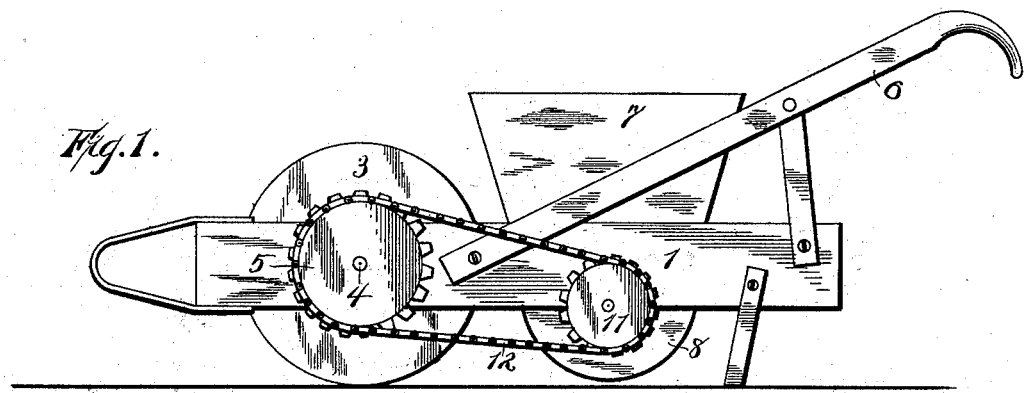
Figure 2:
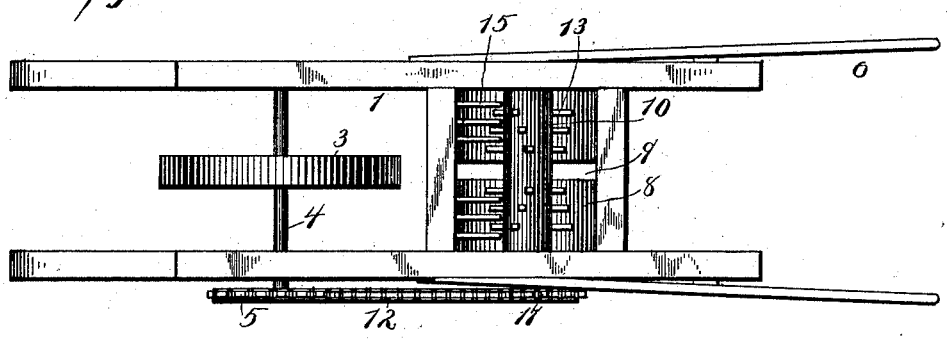
Figure 3:
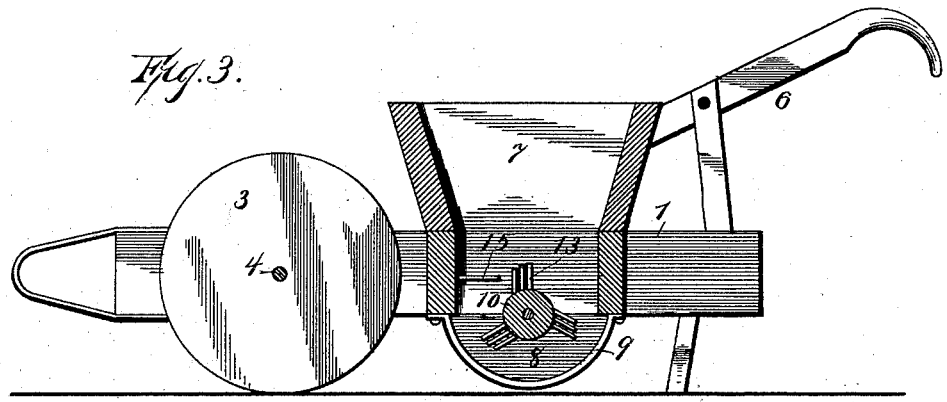

In the accompanying drawings, Figure 1 is a side elevation of my machine. Fig. 2 is a top plan view thereof, with the hopper removed. Fig. 3 is a central, vertical, longitudinal section of my invention.

Referring to the figures on the drawings: 1 indicates the frame of my machine, which may consist of two bars or pieces of wood suitably joined together and adapted to carry between them a wheel 3.

4 indicates a shaft upon which this wheel is mounted and 5 a sprocket wheel upon the outside of the frame secured to the shaft and adapted to be rotated by it.

6 indicates handles by which my machine may be propelled after the manner of a wheelbarrow; or, it may be arranged for horse power, if desired.

7 indicates a hopper carried upon the frame and 8 indicates a pulverizing chamber beneath the hopper.

9 indicates a longitudinal slot in the bottom of the pulverizing chamber through which the pulverized compound is, in practice, distributed.

10 indicates a roller carried in suitable bearings in the sides of the pulverizing chamber and carrying, on one end, a sprocket wheel 11 whereby it may be operatively united to the sprocket wheel by a sprocket band 12.

It will be perceived, therefore, that as the machine is carried upon its wheel it imparts rotary motion to the roller within the pulverizing chamber. The roller is provided with a series of spines 13, each series being arranged convergingly upon the roller and with a middle and large space directly over the slip 9 in the distributing chamber. Consequently, by the rotation of the roller, the material in the hopper is gradually pulverized and, being constantly urged toward the distributing slit, is deposited in the row over which the machine travels.

15 indicates projections extending from one side of the distributing chamber in the path of the spines and is adapted to break up and, as it were, sift the particles of the fertilizing material before it drops into the lower part of the distributing chamber.

What I claim is—

1. In a fertilizer distributer, the combination with frame and hopper, of a central longitudinal slot in the bottom thereof, a roller mounted transversely within the hopper provided with a number of rows of converging spines and an enlarged space between the spines at the junction of their converging lines, substantially as specified.

2. In a fertilizer distributer, the combination with a frame and hopper provided with a central longitudinal slot, of a roller mounted transversely within said hopper, converging lines of spines upon the roller, a gear upon the roller outside of the hopper, a single drive wheel mounted in suitable bearings at the front of the frame, and a gear carried upon the shaft thereof and adapted to be geared to the gear on the roller, substantially as specified.

3. In a fertilizer distributer, the combination with a frame, wheel, hopper, distributing chamber and roller operatively connected with the wheel, of a central, longitudinal slot in the pulverizing chamber, the convergingly arranged series of spines upon the roller, and an enlarged space between the spines opposite the slit in the chamber, substantially as and for the purpose specified.

In testimony of all which I have hereunto subscribed my name.

ASA WELHORN McCONNELL.

Witnesses:
JOE H. SCOTT,
LOOMIS LITTLE.